(12) United States Patent
Takahashi

(10) Patent No.: US 9,350,904 B2
(45) Date of Patent: May 24, 2016

(54) VIDEO SIGNAL PROCESSING APPARATUS CONFIGURED TO DISPLAY A VIDEO HAVING A RESOLUTION HIGHER THAN FULL HD, VIDEO DISPLAY APPARATUS, AND ELECTRONIC DEVICE

(71) Applicant: Sharp Kabushiki Kaisha, Osaka-shi, Osaka (JP)

(72) Inventor: Masayuki Takahashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/402,196

(22) PCT Filed: May 24, 2013

(86) PCT No.: PCT/JP2013/064445
§ 371 (c)(1),
(2) Date: Nov. 19, 2014

(87) PCT Pub. No.: WO2013/180021
PCT Pub. Date: Dec. 5, 2013

(65) Prior Publication Data
US 2015/0098019 A1 Apr. 9, 2015

(30) Foreign Application Priority Data
May 28, 2012 (JP) .................................. 2012-121247

(51) Int. Cl.
*H04N 5/445* (2011.01)
*H04N 5/04* (2006.01)
(Continued)

(52) U.S. Cl.
CPC ................ *H04N 5/04* (2013.01); *G06F 3/1446* (2013.01); *H04N 5/14* (2013.01); *H04N 11/002* (2013.01); *G09G 2300/026* (2013.01); *G09G 2330/08* (2013.01)

(58) Field of Classification Search
CPC .... G06F 3/1446; G06F 3/1462; G06F 3/1438; G09F 5/006; G09F 2300/026; H04N 9/3147; H04N 9/12; H04N 9/3163; H04N 5/45; H04N 5/445
USPC ......................................................... 348/564
See application file for complete search history.

(56) References Cited

U.S. PATENT DOCUMENTS 5,481,306 A * 1/1996 Senso .................. H04N 9/7973
345/903
7,012,576 B2 * 3/2006 Edmonds ............... G09G 5/006
345/1.1
(Continued)

FOREIGN PATENT DOCUMENTS

JP 10-198325 A 7/1998
JP 10-222644 A 4/2008
(Continued)

OTHER PUBLICATIONS

International Search Report PCT/ISA/210 for International Application No. PCT/JP2013/064445 dated Jul. 31, 2013.
(Continued)

*Primary Examiner* — Michael Lee
(74) *Attorney, Agent, or Firm* — Harness, Dickey & Pierce, P.L.C.

(57) ABSTRACT

The time necessary for specifying an improper video signal is significantly reduced. An input signal determination circuit and a signal distribution circuit are included, the input signal determination circuit determining, for video signals to be input to a synchronization circuit, whether or not each of the video signals satisfies a display reference for performing video display in a division display area corresponding to the video signal, the signal distribution circuit distributing, for another proper video signal for a video signal determined by the input signal determination circuit to be a video signal that does not satisfy the display reference for performing video display.

20 Claims, 5 Drawing Sheets

(51) Int. Cl.
*G06F 3/14* (2006.01)
*H04N 5/14* (2006.01)
*H04N 11/24* (2006.01)

(56) References Cited

U.S. PATENT DOCUMENTS

| | | | | |
|---|---|---|---|---|
| 7,675,479 B2* | 3/2010 | Jung | ............... | G06F 3/1446 345/1.1 |
| 7,740,361 B2* | 6/2010 | Jaynes | ............... | H04N 9/3147 345/1.3 |
| 2003/0098820 A1* | 5/2003 | Someya | ............... | G06F 3/1431 345/1.3 |
| 2004/0233125 A1* | 11/2004 | Tanghe | ............... | G06F 3/1446 345/1.3 |
| 2005/0117054 A1* | 6/2005 | Higashi | ............... | G09G 3/3611 348/383 |
| 2005/0134526 A1* | 6/2005 | Willem | ............... | G06F 3/1446 345/1.3 |
| 2005/0253777 A1* | 11/2005 | Zehner | ............... | G06F 3/1446 345/1.3 |
| 2006/0290890 A1* | 12/2006 | Saito | ............... | G03B 21/14 353/30 |
| 2007/0120763 A1* | 5/2007 | De Paepe | ............... | G06F 3/03547 345/1.3 |
| 2007/0273795 A1* | 11/2007 | Jaynes | ............... | H04N 9/3147 348/745 |
| 2009/0289874 A1* | 11/2009 | Ha | ............... | H04N 7/0122 345/1.3 |
| 2010/0060548 A1* | 3/2010 | Choi | ............... | G06F 3/0414 345/1.3 |
| 2010/0141552 A1* | 6/2010 | Ferlitsch | ............... | G06F 3/1446 345/1.3 |
| 2011/0211120 A1 | 9/2011 | Taniguchi et al. | | |
| 2011/0231791 A1* | 9/2011 | Itahana | ............... | G06F 1/1645 715/799 |

FOREIGN PATENT DOCUMENTS

| | | |
|---|---|---|
| JP | 2008-76614 A | 4/2008 |
| JP | 2011-180336 A | 9/2011 |

OTHER PUBLICATIONS

Written Opinion of the International Searching Authority PCT/ISA/237 for International Application No. PCT/JP2013/064445 dated Jul. 31, 2013.

* cited by examiner (a)

(b)

(c) CH HAVING ERROR (d)

VIDEO SIGNAL PROCESSING APPARATUS CONFIGURED TO DISPLAY A VIDEO HAVING A RESOLUTION HIGHER THAN FULL HD, VIDEO DISPLAY APPARATUS, AND ELECTRONIC DEVICE

TECHNICAL FIELD

The present invention relates to a video display apparatus that displays a video with a resolution higher than the Full HD resolution (for example, 4k2k or higher).

BACKGROUND ART

In recent years, a video display apparatus has been proposed which displays a video with a resolution higher than the Full HD resolution (for example, 4k2k or higher).

In a video display apparatus that displays a video with such a high resolution, a display area is divided into a plurality of areas. A high resolution video is displayed by inputting, to each of the display areas obtained as a result of division (division display areas), a video signal among a plurality of video signals into which the high-resolution video has been divided (Patent Document 1 and the like).

CITATION LIST

Patent Literature

Patent Document 1: Japanese Unexamined Patent Application Publication "Japanese Unexamined Patent Application Publication No. 2011-180336"

SUMMARY OF INVENTION

Technical Problem

In the case where a display area is divided into a plurality of areas and a high resolution video is displayed by inputting, to each of the division display areas, a video signal among a plurality of video signals into which the high-resolution video has been divided, it is necessary to achieve synchronization for video signals to be input to the respective division display areas.

For example, in a video display apparatus for 8K Ultra High Definition Television (8K UHD), a display area is divided into 16 areas, a video signal is divided into 16 signals, and the 16 video signals are processed so as to be input to the respective division display areas in parallel. Thus, when the 16 video signals obtained as a result of division include a video signal that is improperly input, synchronization is not achieved properly. For example, as illustrated in FIGS. 3(a) and 3(b), errors occur such that a screen is improperly displayed or the screen is not displayed.

This is because since the 16 video signals are independent from each other and include a signal for achieving synchronization therebetween, when even one of the video signals is improperly input, there is nothing to be displayed in the division display area for the video signal that is improperly input and there is no longer any way to achieve synchronization.

In this manner, when a screen is improperly displayed, it is clear that there is a video signal that has been improperly input among video signals input to division display areas; however, it is not easy to specify the video signal that has been improperly input. In this case, since it is necessary to check the video signals one by one, a problem arises in that it takes time to specify the video signal that has caused an improperly displayed screen, that is, an improper video signal.

The present invention has been made in light of the above-described problems and has an object to provide a video signal processing apparatus and a video display apparatus, the video signal processing apparatus being an apparatus in which a display area is divided into a plurality of division display areas and a high-resolution video is displayed by inputting, to each of the division display areas, a video signal among video signals obtained by dividing the high-resolution video, the video signal processing apparatus and the video display apparatus making it possible to significantly reduce a time necessary to specify an improper video signal in the case where the improper video signal is included in the video signals obtained as a result of division.

Solution to Problem

In order to solve the above-described problems, a video signal processing apparatus of the present invention is a video signal processing apparatus that outputs video signals to respective division display areas in parallel, which are obtained by dividing a display area of a display apparatus. The video signal processing apparatus includes
a synchronization unit that achieves synchronization for video signals to be input to the respective division display areas,
a display reference determination unit that determines, for video signals to be input to the synchronization unit, whether or not each of the video signals satisfies a display reference for performing video display in a division display area corresponding to the video signal, and
a signal replacement unit that replaces a video signal determined by the display reference determination unit to be a video signal that does not satisfy the display reference for performing video display with a video signal for displaying a video used to specify a division display area to which the video signal determined to be a video signal that does not satisfy the display reference is to be input.

According to the above-described configuration, for each of the video signals to be input to the synchronization unit, which achieves synchronization for video signals to be input to respective division display areas, it is determined whether or not the video signal satisfies the display reference for performing video display in the division display area corresponding to the video signal. By replacing a video signal determined to be a video signal that does not satisfy the display reference with a video signal for displaying a video used to specify a division display area to which the video signal determined to be a video signal that does not satisfy the display reference is to be input, a video different from an original video is displayed in the display area corresponding to the video signal determined to be a video signal that does not satisfy the display reference (an improper video signal) among video signals obtained as a result of division.

Here, the display reference for performing video display in a division display area indicates a clock frequency set for a video signal and the format of a synchronization signal. That is, the display reference determination unit determines whether or not the format of a video signal is a predetermined format.

In addition, a video signal for displaying a video different from the original video may be, for example, a video signal to be displayed in another display area or a video signal for displaying the status of a signal, and may be any signal as long as the signal is a signal for displaying a video with which a division display area corresponding to a video signal determined to be improper may be specified.

In this manner, in a division display area in which a video different from an original video is displayed, a video corresponding to a video signal that is able to be displayed in the division display area is displayed. Thus, unlike in the past, an improper video signal is not simply input to the synchronization unit. Thus, the case does not occur where the entirety of the display screen of a video display apparatus is improperly displayed or nothing is displayed due to a video signal synchronization failure.

In addition, a division display area in which a video different from an original video is displayed may be easily distinguished from division display areas in which an original video is displayed. Thus, a video signal corresponding to the division display area may be easily specified as a video signal with which proper display is impossible (an improper video signal).

Thus, in the case where video signals obtained as a result of division include an improper video signal, there is an advantage in that the time necessary for specifying the improper video signal may be significantly reduced.

Preferably, the signal replacement unit replaces a video signal determined by the display reference determination unit to be a video signal that does not satisfy the display reference for performing video display with any one of video signals determined by the display reference determination unit to be video signals that are able to be displayed in division display areas.

According to the above-described configuration, since it is unnecessary to additionally create a video different from an original video, in the case where video signals obtained as a result of division include an improper video signal, the time necessary for specifying the improper video signal may further be reduced.

Preferably, the signal replacement unit replaces a video signal determined by the display reference determination unit to be a video signal that does not satisfy the display reference for performing video display with a preset video signal with a high priority among video signals determined by the display reference determination unit to be video signals that satisfy the display reference for performing video display.

According to the above-described configuration, since it is unnecessary to additionally create a video different from an original video and the priority as to which video is to be displayed is preset, in the case where video signals obtained as a result of division include an improper video signal, the time necessary for specifying the improper video signal may further be reduced.

Preferably, the signal replacement unit replaces a video signal determined by the display reference determination unit to be a video signal that does not satisfy the display reference for performing video display with a video signal that indicates an analysis result of the video signal determined to be a video signal that does not satisfy the display reference.

According to the above-described configuration, since an improper video signal may be specified and a cause of the improper video signal may be specified, the time necessary for recovering a proper video signal may be reduced.

Preferably, the video signal that indicates the analysis result of the video signal is a video signal with which at least one of a clock frequency, a horizontal resolution, and a vertical resolution is displayed.

According to the above-described configuration, by displaying at least one of a clock frequency, a horizontal resolution, and a vertical resolution as an analysis result of an improper video signal, a user (a video adjuster) may quickly determine what to do in order to obtain a proper video signal.

Preferably, the signal replacement unit replaces a video signal determined by the display reference determination unit to be a video signal that does not satisfy the display reference for performing video display with a color signal with which the entirety of a division display area to which the video signal is to be input is displayed in a single color.

According to the above-described configuration, since a video different from an original video is replaced with a color signal, in the case where video signals obtained as a result of division include an improper video signal, the improper video signal may be made noticeable and as a result the time necessary for specifying the video signal may further be reduced.

Preferably, the color signal is a solid black signal with which the entirety of the division display area is filled with black color.

According to the above-described configuration, since an improper video signal may be easily distinguished from other video signals, the time necessary for specifying the video signal may further be reduced.

Preferably, the video signal processing apparatus is installed in a video display apparatus.

Thus, in the case where video signals obtained as a result of division include an improper video signal, a user may easily specify the improper video signal by just checking the video display apparatus, and as a result the time necessary for specifying the improper video signal may be significantly reduced.

Preferably, the video signal processing apparatus is installed in various electronic devices.

Advantageous Effects of Invention

A video signal processing apparatus of the present invention is a video signal processing apparatus that outputs video signals to respective division display areas in parallel, which are obtained by dividing a display area of a display apparatus. The video signal processing apparatus includes a synchronization unit that achieves synchronization for video signals to be input to the respective division display areas, a display reference determination unit that determines, for video signals to be input to the synchronization unit, whether or not each of the video signals satisfies a display reference for performing video display in a division display area corresponding to the video signal, and a signal replacement unit that replaces a video signal determined by the display reference determination unit to be a video signal that does not satisfy the display reference for performing video display with a video signal for displaying a video used to specify a division display area to which the video signal determined to be a video signal that does not satisfy the display reference is to be input, and thus has an advantage in that the time necessary for specifying the improper video signal may be significantly reduced in the case where video signals obtained as a result of division include the improper video signal.

DESCRIPTION OF EMBODIMENTS

First Embodiment

A description of an embodiment of the present invention is as follows.

Note that, in the first embodiment, a video display apparatus that displays an 8K UHD video with a resolution of 8k4k (7680×4320 dots) will be described as a video display apparatus of the present invention.

By the way, since a video with a resolution higher than the Full HD resolution (1920×1080 dots) is not standardized at the present for broadcast waves and video mediums, it is impossible to simply transmit and input such a high-resolution video signal to a video display apparatus 101.

Thus, it is considered that a video is divided into a plurality of videos, the resolution of the videos obtained by division is made to be almost the same as the Full HD resolution, and the videos are transmitted by broadcast waves or a video medium and input to the video display apparatus 101.

In the first embodiment, the case will be described where an original video with a resolution of 7680×4320 dots is divided into 16 videos with a resolution of 1920×1080 dots.

Figure 1:
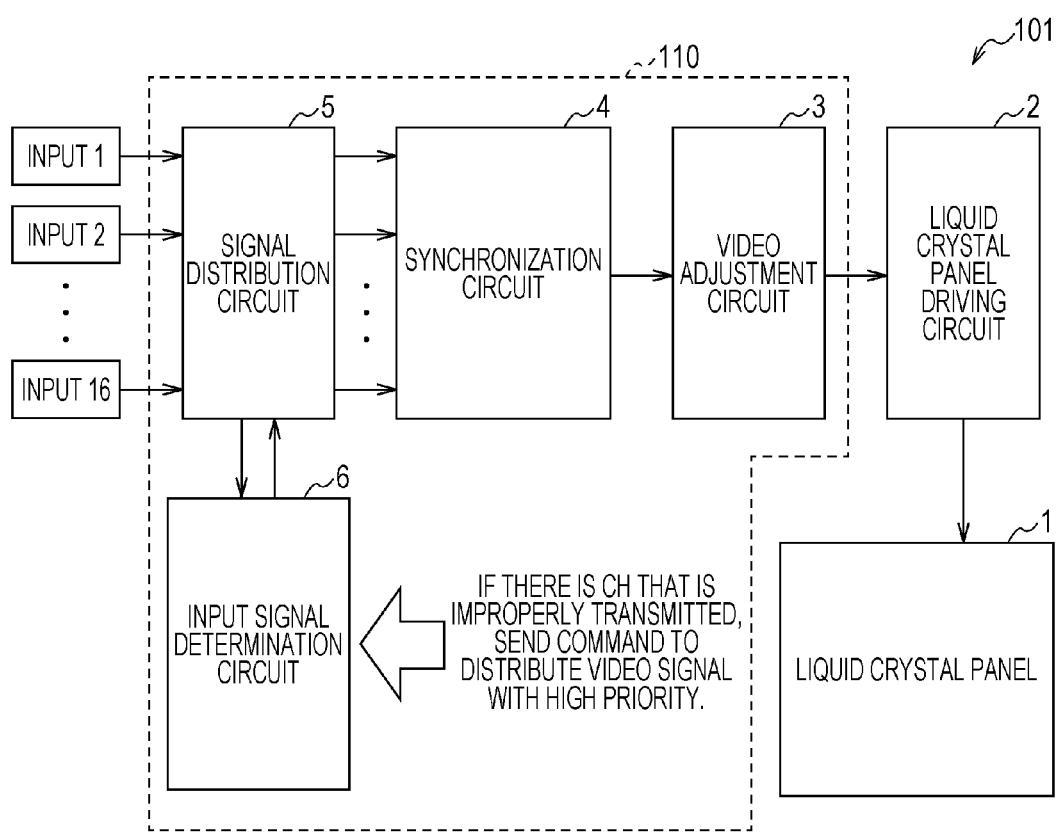
FIG. 1 is a block diagram of a schematic configuration of a video display apparatus according to an embodiment of the present invention.

(Description of Overview of Video Display Apparatus) . . . FIG. 1

FIG. 1 is a block diagram of a schematic configuration of the video display apparatus 101 according to the first embodiment.

The video display apparatus 101 includes, as illustrated in FIG. 1, a liquid crystal panel 1, a liquid crystal panel driving circuit 2, a video adjustment circuit 3, a synchronization circuit (a synchronization unit) 4, a signal distribution circuit (a signal replacement unit) 5, and an input signal determination circuit (a display reference determination unit) 6.

The liquid crystal panel 1 has a resolution of 8k4k (7680× 4320 dots). As described above, the display area is divided into 16 display areas such that 16 videos with 1920×1080 dots may be displayed, and the display areas obtained as a result of division (division display areas) are driven individually and independently.

The liquid crystal panel driving circuit 2 drives the 16 division display areas of the liquid crystal panel 1 independently to each other. Specifically, videos corresponding to the respective division display areas are displayed by supplying video signals supplied from the video adjustment circuit 3 to the respective division display areas of the liquid crystal panel 1 corresponding to the video signals.

The video adjustment circuit 3 adjusts the tone, gamma, brightness, contrast, and the like of a video for individual video signals supplied from the synchronization circuit 4.

The synchronization circuit 4 achieves synchronization for 16 video signals supplied from the signal distribution circuit 5 and outputs the 16 video signals to the video adjustment circuit 3 located downstream thereof.

The signal distribution circuit 5 receives the 16 video signals (inputs 1 to 16) and transfers the 16 video signals (the inputs 1 to 16) to the input signal determination circuit 6 located downstream thereof. The signal distribution circuit 5 distributes and outputs any of the 16 video signals (the inputs 1 to 16) to the synchronization circuit 4 in response to a determination result supplied from the input signal determination circuit 6.

The input signal determination circuit 6 determines whether or not the video signals (the inputs 1 to 16) supplied from the signal distribution circuit 5 are video signals (CH) that have been properly transmitted. When there is a video signal that is improperly transmitted, the input signal determination circuit 6 commands the signal distribution circuit 5 to distribute a preset video signal with a high priority for the video signal that is improperly transmitted.

That is, the input signal determination circuit 6 serves as a display reference determination unit that determines, for each of the video signals (the inputs 1 to 16) to be input to the synchronization circuit 4, whether or not the video signal satisfies a display reference for performing video display in a division display area corresponding to the video signal.

Here, the display reference for performing video display in a division display area indicates a clock frequency set for a video signal and the format of a synchronization signal. That is, the display reference determination unit determines whether or not the format of a video signal is a predetermined format. That is, since a video signal having the predetermined format is input, it is determined whether or not the video signal is a video signal that has been properly transmitted (a proper video signal) or a video signal that is improperly transmitted (an improper video signal) in accordance with the clock frequency and the frequency of a synchronization signal.

The signal distribution circuit 5, which has received a command from the input signal determination circuit 6, serves as a signal replacement unit that replaces a video signal determined to be a video signal that does not satisfy the display reference for performing video display with a video signal for displaying a video used to specify a division display area to which the video signal determined to be a video signal that does not satisfy the display reference is to be input. That is, the signal distribution circuit 5 distributes a preset video signal with a high priority for a video signal that is improperly transmitted. Examples of a distribution method in this case include a method in which a selector is arranged at an input portion of the signal distribution circuit 5 and which input signal is to be input is selected and a method in which switching is performed for signal wiring lines at various portions such as a buffer portion and an output portion, and any of the methods may be employed.

As described above, the video adjustment circuit 3, the synchronization circuit 4, the signal distribution circuit 5, and the input signal determination circuit 6 serving as constituents of the video display apparatus 101 according to the first embodiment constitute a video signal processing apparatus 110 that processes video signals to be output to the liquid crystal panel 1.

In the video display apparatus 101 having the above-described configuration, Full HD (1920×1080 dots) video signals are input in parallel using 16 cables to the liquid crystal panel 1 with a resolution of 8k4k. These video signals correspond to videos of respective areas that are one-sixteenths of the liquid crystal panel 1 with a resolution of 8k4k (division display areas).

In the case of a conventional video display apparatus, when no video signal is input to even one of the 16 cables or the video format of a video signal is different, that is, there is a CH to which no video signal is input, a synchronization module is unable to achieve synchronization for the entirety of the video. Thus, a screen is improperly displayed or nothing is able to be displayed on the screen.

However, in the video display apparatus 101 having the above-described configuration, the entirety of the screen is prevented from being improperly displayed and an erroneous video signal channel is easily specified by distributing a video of another area to an area of a CH to which no video signal is input, that is, a division display area to which an improper video signal is to be input.

Figure 2:
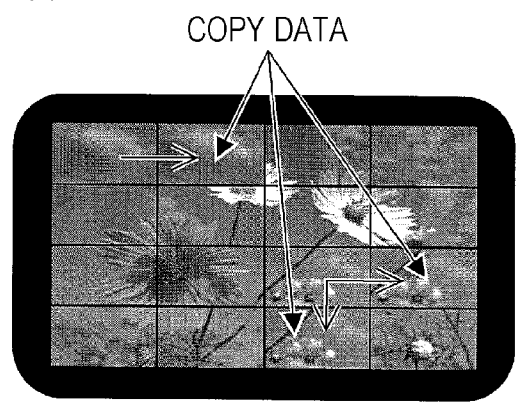
FIG. 2 is a diagram for describing a distribution process of video signals in the video display apparatus illustrated in FIG. 1.
Figure 2:
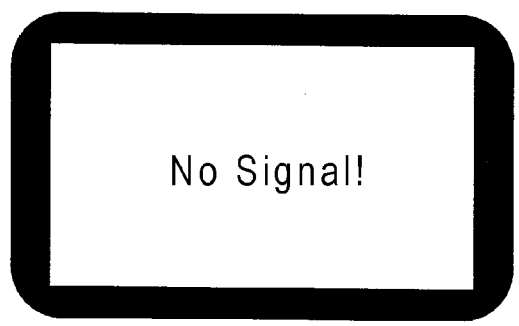

(Video Signal Replacement Process) . . . FIG. 2

Here, a video signal replacement process will be described. In the first embodiment, the video signal replacement process will be described in the following with reference to FIG. 2 as a distribution process for video signals in the signal distribution circuit 5.

Sixteen video signals corresponding to sixteen respective division display areas are divided into four groups, and priorities are assigned in each of the groups and priorities are assigned to the groups.

That is, in the signal distribution circuit 5, a video signal determined to be a video signal that does not satisfy the display reference for performing video display (hereinafter referred to as an improper video signal) is replaced with a video signal having the priority that is next higher than that of the improper video signal (the video signal having the next higher priority than the improper video signal is distributed).

Note that when all the video signals are improper, "No Signal" is displayed as illustrated in FIG. 2(*d*).

Regarding the above-described priorities, for example, as illustrated in FIG. 2(*a*), four areas obtained by dividing the screen vertically and horizontally (division display areas) are individually named groups A, B, C, and D, and the group A has the highest priority. In addition, regions of each of the groups are prioritized from the upper left to the right as 1, 2, 3, and 4.

Here, FIG. 2(*b*) illustrates the case where errors occur in video signals to be input to division display areas A2, D2, and D3. To the division display area A2, a video signal to be input to a division display area A1 is distributed, the division display area A1 having a higher priority than the division display area A2 in the group. To the division display area D2, a video signal to be input to a division display area D1 is distributed, the division display area D1 having a higher priority than the division display area D2 in the group. To the division display area D3, a video signal to be input to the division display area D2, which is an area having the next higher priority than the division display area D3, is supposed to be distributed; however, since an error also occurs in the video signal to be input to the division display area D2, the video signal to be input to the division display area D1, which is an area having a further higher priority than the division display area D2, is distributed.

To distribute video signals, it is not especially necessary to divide the screen into groups as described above. As illustrated in FIG. 2(*c*), 16 division display areas are prioritized in a collection manner and a video signal may be distributed in accordance with priority.

Figure 3:
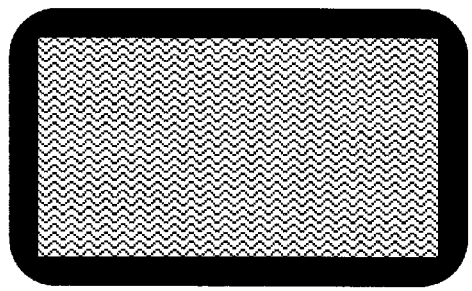
FIG. 3 is a diagram for describing advantages of the video display apparatus illustrated in FIG. 1.
Figure 3:
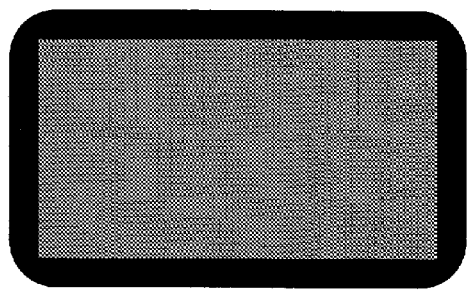
Figure 3:
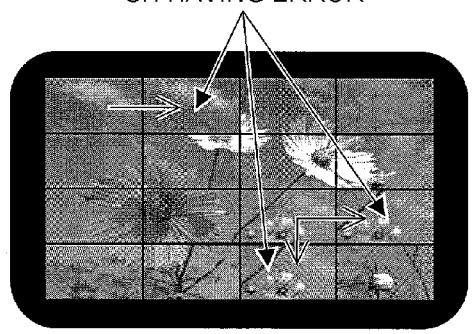
Figure 3:
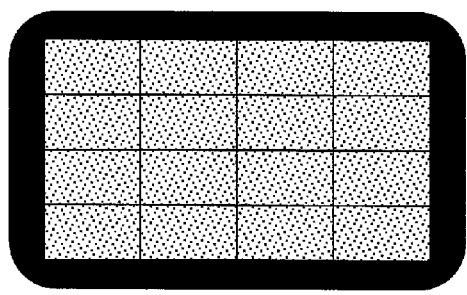

(Description of Advantages) . . . FIG. 3

FIG. 3 is a diagram for describing advantages of the video display apparatus 101 according to the first embodiment.

Normally, an ultra high definition display such as an 8k4k display receives a plurality of video signals in parallel. In the case of an ultra high definition display using a plurality of displays such as a multi-display, the displays perform display individually and independently. Thus, even when a video signal is improperly transmitted, just the display alone does not perform display, and consequently there are not really any problems. However, in the case where display is performed with a single liquid crystal panel, it is necessary to achieve synchronization for a plurality of video signals and perform display. Thus, even when one video signal is improperly transmitted, synchronization is unable to be achieved and display is unable to be performed.

In such a case, a video for which synchronization is not achieved is displayed as illustrated in FIG. 3(*a*), or a video that is black on the entire screen is displayed as illustrated in FIG. 3(*b*).

Through such a display error, it is unable to determine which video signal has an error and it is necessary to check video signals one by one. Thus, it takes time to specify an improper video signal.

However, in the video display apparatus 101 according to the first embodiment, when even one video signal is properly transmitted, a video may be displayed by replacing a video signal that is improperly transmitted with a video signal that is properly transmitted and the video signal that is improperly transmitted may be easily specified.

That is, as illustrated in FIG. 3(*c*), display is performed by copying data in a CH having an error (a division display area to which an improper video signal is to be input) and thus it is easy to specify which video signal has an error.

In addition, since it is difficult to prepare a 8k4k signal source, even when a connection is made to a 2k1k (Full HD) signal source, panel check and video adjustment may be performed easily by copying a screen and displaying the copied screen on the full screen as illustrated in FIG. 3(*d*).

As described above, according to the video signal processing apparatus 110 of the video display apparatus 101 according to the first embodiment, for video signals to be input to the synchronization circuit 4, it is determined whether or not each of the video signals satisfies the display reference for performing video display in the division display area corresponding to the video signal, the synchronization circuit 4 achieving synchronization for video signals to be input to respective division display areas of the liquid crystal panel 1. By replacing a video signal determined to be a video signal that does not satisfy the display reference with a video signal for displaying a video used to specify a division display area to which the video signal determined to be a video signal that does not satisfy the display reference is to be input, a video different from an original video is displayed in the display area corresponding to the video signal determined to be a video signal that does not satisfy the display reference (an improper video signal) among video signals obtained as a result of division.

In this manner, in a division display area in which a video different from an original video is displayed, a video corresponding to a video signal that is able to be displayed in the division display area is displayed. Thus, unlike in the past, an improper video signal is not simply input to the synchronization unit. Thus, the case does not occur where the entirety of the display screen of a video display apparatus is improperly displayed or nothing is displayed due to a video signal synchronization failure.

In addition, a division display area in which a video different from an original video is displayed may be easily distinguished from division display areas in which an original video is displayed. Thus, a video signal corresponding to the division display area may be easily specified as a video signal with which proper display is impossible (an improper video signal).

Thus, in the case where video signals obtained as a result of division include an improper video signal, there is an advantage in that the time necessary for specifying the improper video signal may be significantly reduced.

In the first embodiment, a video signal determined to be a video signal that does not satisfy the display reference for performing video display is replaced with any one of video signals determined to be video signals that are able to be displayed in division display areas. Specifically, video signals determined to be video signals that are able to be displayed in division display areas are prioritized in advance and a video signal determined to be a video signal that does not satisfy the display reference for performing video display is replaced with a video signal with a higher priority than that of the video signal determined to be a video signal that does not satisfy the display reference.

Note that, in the first embodiment, an example has been described in which video signal distribution is performed for a division display area to which an improper video signal is to be input, such that a proper video signal is input to the division display area. However, a video signal for displaying a video different from the original video may be, for example, a video signal to be displayed in another display area or a video signal for displaying the status of a signal, and may be any signal as long as the signal is a signal for displaying a video with which a division display area corresponding to a video signal determined to be improper may be specified.

In addition, an analysis result of an improper video signal may also be displayed in a division display area to which the improper video signal is to be input.

In the following second embodiment, an example will be described in which an analysis result of an improper video signal is displayed in a division display area to which the improper video signal is to be input.

Figure 4:
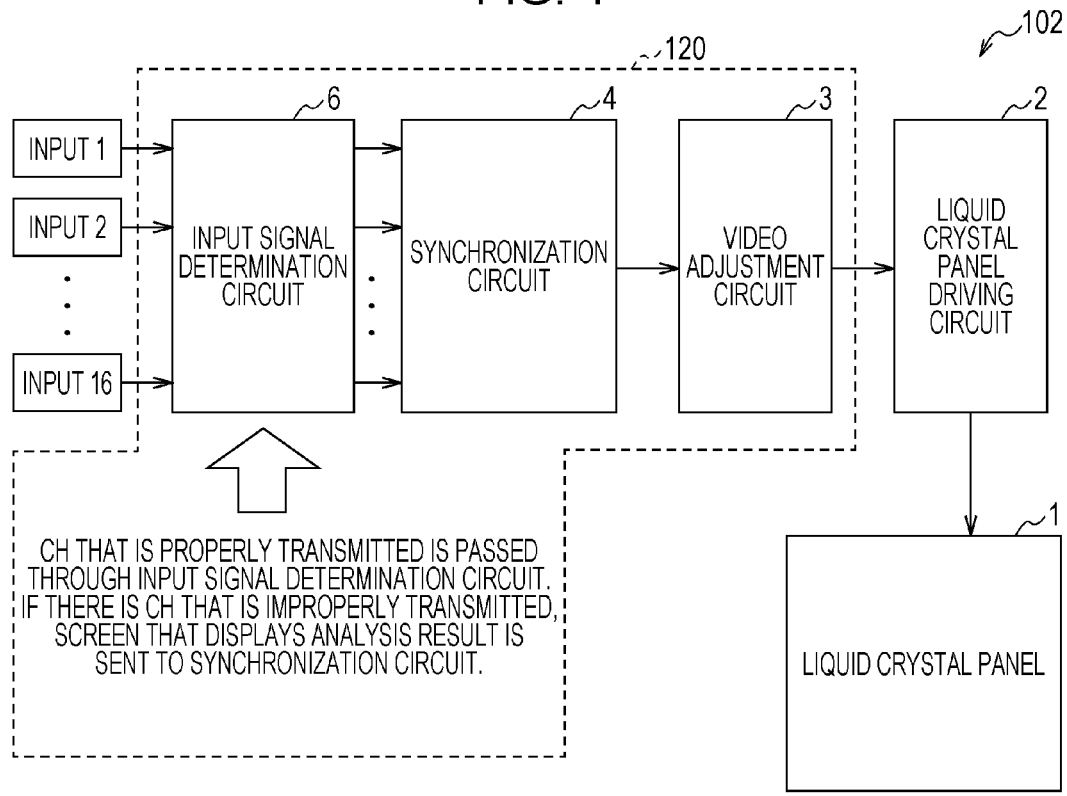
FIG. 4 is a block diagram of a schematic configuration of a video display apparatus according to another embodiment of the present invention.

Second Embodiment (Description of Overview of Video Display Apparatus) . . . FIG. 4

A description of another embodiment of the present invention is as follows. Note that members the same as those in the first embodiment are denoted by the same reference numerals and the description thereof will be omitted.

FIG. 4 is a block diagram of a schematic configuration of a video display apparatus 102 according to the second embodiment.

The video display apparatus 102 includes, as illustrated in FIG. 4, the liquid crystal panel 1, the liquid crystal panel driving circuit 2, and a video signal processing apparatus 120.

Here, the video display apparatus 102 differs from the video display apparatus 101 of the first embodiment in that the video signal processing apparatus 120 does not include the signal distribution circuit 5, which is included in the video signal processing apparatus 110.

That is, in the second embodiment, another video signal is not distributed instead of an improper video signal. Instead, a video signal determined to be an improper video signal is analyzed by the input signal determination circuit 6, and the analysis result is displayed in a division display area of the liquid crystal panel 1 to which the improper video signal is to be input.

In the case of a CH that is properly transmitted (a proper video signal), the input signal determination circuit 6 allows the CH to pass therethrough. In the case of a CH that is improperly transmitted (an improper video signal), the input signal determination circuit 6 outputs a video signal for displaying an analysis result of the improper video signal to the synchronization circuit 4.

That is, when video signals obtained as a result of division (inputs 1 to 16) are input, the input signal determination circuit 6 determines whether or not each of the video signals is proper, simply outputs proper video signals to the synchronization circuit 4 located downstream thereof, analyzes improper video signals, and outputs video signals for displaying analysis results to the synchronization circuit 4.

Examples of an analysis result of an improper video signal include a clock frequency, a horizontal resolution, a vertical resolution, and the like. In addition, in the case where an improper video signal is unable to be analyzed, "No Signal" is displayed.

Basically, the clock of a video signal and the frequency of a synchronization signal are analyzed and the analysis results are displayed. Specifically, the frequency of a vertical synchronization signal (Vsync) corresponding to a frame rate, the frequency of a horizontal synchronization signal (Hsync), the number of horizontal synchronization signals in one vertical interval, the number of data in one horizontal interval, the number of lines in one vertical interval, and the like are analyzed and displayed. Furthermore, if needed, the Vsync length, the Hsync length, the front porch length, the back porch length, and the like are also displayed.

Figure 5:
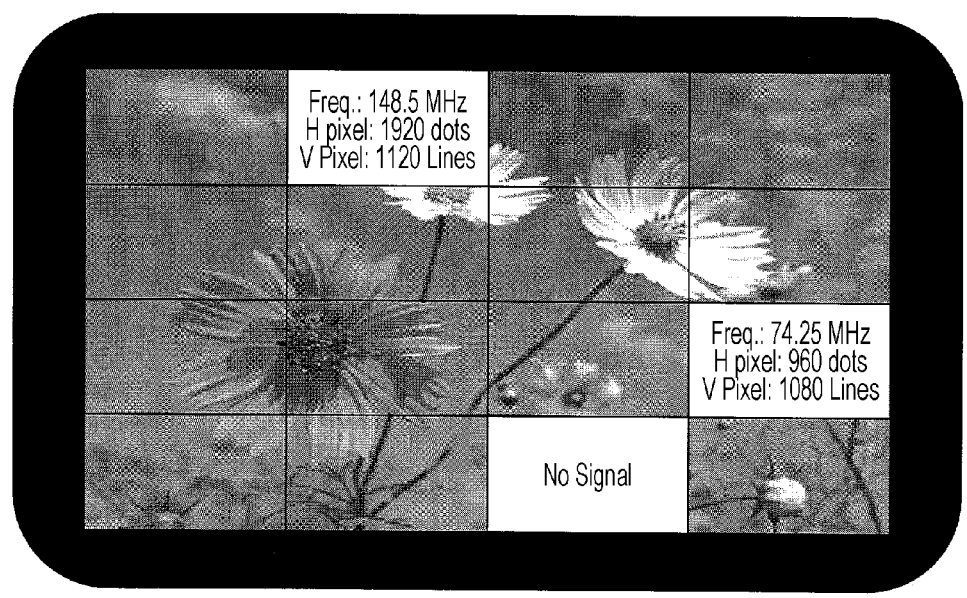
FIG. 5 is a diagram for describing advantages of the video display apparatus illustrated in FIG. 4.

A signal cable connection error, a broken signal cable, a contact failure, setting errors of a signal source, or the like may cause errors in transmission. In such a case, which CH's signal has an error and what is the error may be easily determined by displaying the state of an input video signal as illustrated in FIG. 5.

Note that, in the second embodiment, an example has been described in which a division display area to which an improper video signal is to be input displays an analysis result of the improper video signal. In the following third embodiment, an example will be described in which display is performed in solid black or another color in a division display area to which an improper video signal is to be input.

Figure 6:
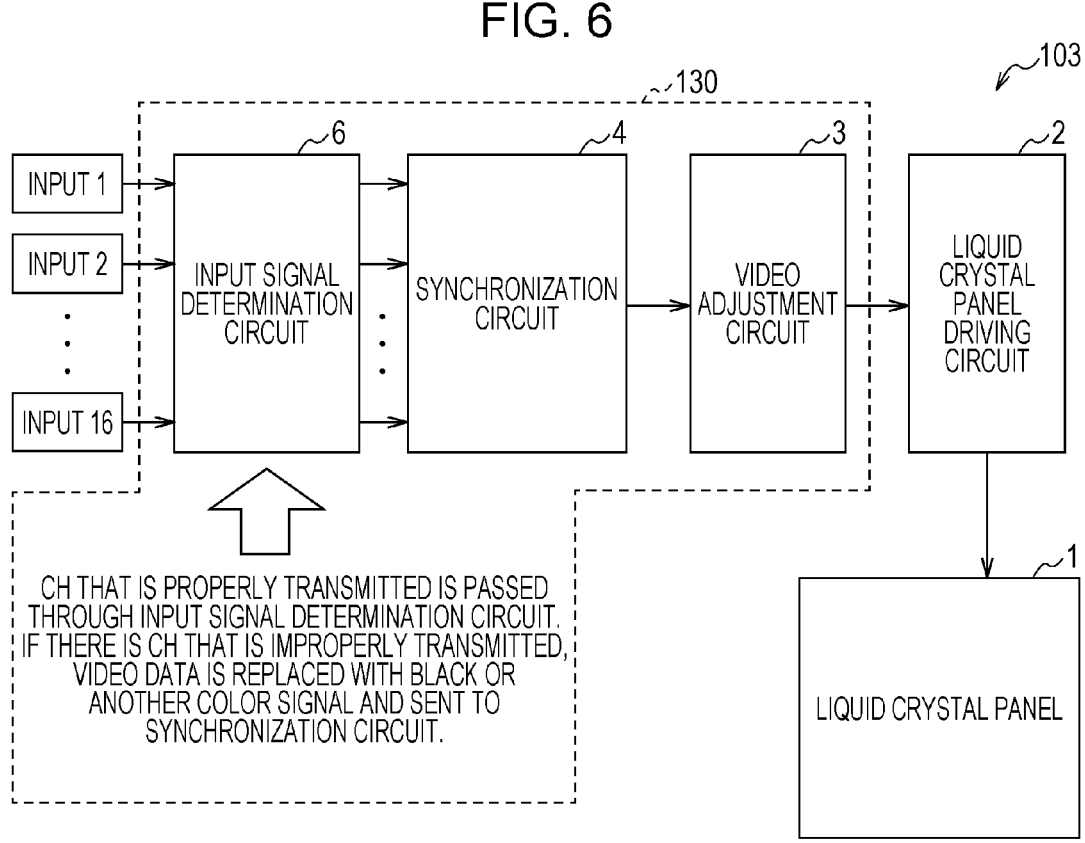
FIG. 6 is a block diagram of a schematic configuration of a video display apparatus according to further another embodiment of the present invention.

Third Embodiment (Description of Overview of Video Display Apparatus) . . . FIG. 6

A description of another embodiment of the present invention is as follows. Note that members the same as those in the first and second embodiments are denoted by the same reference numerals and the description thereof will be omitted.

FIG. 6 is a block diagram of a schematic configuration of a video display apparatus 103 according to the third embodiment.

The video display apparatus 103 includes, as illustrated in FIG. 6, the liquid crystal panel 1, the liquid crystal panel driving circuit 2, and a video signal processing apparatus 130. Here, the video display apparatus 103 has almost the same configuration as the video display apparatus 102 of the second embodiment; however, the input signal determination circuit 6 included in the video signal processing apparatus 130 functions in a slightly different manner.

That is, in the third embodiment, the input signal determination circuit 6 replaces a video signal determined to be unable to be displayed in a division display area (an improper video signal) with a color signal with which the entirety of the division display area is displayed in a single color, and outputs the color signal to the synchronization circuit 4 located downstream thereof.

As the color signal, black color is used. That is, the division display area is displayed in solid black.

Figure 7:
FIG. 7 is a diagram for describing advantages of the video display apparatus illustrated in FIG. 6.

As a result, as illustrated in FIG. 7, a division display area to which an improper video signal is to be input is displayed in solid black, and it is clear that a video signal to be input to the division display area displayed in solid black has an error.

Note that, as the color signal, not only a black signal for performing display in solid black but also other color signals may also be used.

In addition, in the above-described embodiments, examples have been described in which a video display apparatus that displays an 8K UHD video with a resolution of 8k4k (7680×4320 dots) is assumed and 16 Full HD (1920×1080 dots) video signals are used. However, the present invention is not limited to the above-described examples, and there may be the case where, for example, a 4k2k (3840×2160 dots) video and four Full HD (1920×1080 dots) video signals are used or other combinations may also be used.

In the above-described embodiments, examples have been described in which the video signal processing apparatus (110, 120, 130) is installed in the video display apparatus (101, 102, 103); however, the present invention is not limited to these. The video signal processing apparatus may also be applied to, for example, a device (an electronic device) that does not include a display apparatus but outputs video signals such as a Blu-ray recorder or the like.

The present invention is not limited to the above-described embodiments, and various changes may be made within the scope of the claims. Embodiments obtained by combining technical means disclosed in different embodiments as necessary also fall within the technical scope of the present invention.

INDUSTRIAL APPLICABILITY

The present invention may be used in a video display apparatus that divides and displays a video.

REFERENCE SIGNS LIST 1 liquid crystal panel
2 liquid crystal panel driving circuit
3 video adjustment circuit
4 synchronization circuit (synchronization unit)
5 signal distribution circuit (signal replacement unit)
6 input signal determination circuit (signal replacement unit, display reference determination unit)
101 video display apparatus
102 video display apparatus
103 video display apparatus
110 video signal processing apparatus
120 video signal processing apparatus
130 video signal processing apparatus

The invention claimed is:

1. A video signal processing apparatus configured to output video signals to respective division display areas of a display apparatus in parallel, the video signals being obtained by dividing an input video with a resolution higher than full high-definition (HD) resolution, the division display areas being divided areas of a display area of the display apparatus, the video signal processing apparatus comprising:
a synchronization unit configured to synchronize the video signals to be input to the respective division display areas;
a display reference determination unit configured to determine if one or more of the video signals is an improper video signal that fails to satisfy a display reference for performing video display in a respective one of the division display areas corresponding thereto; and
a signal replacement unit configured to replace the improper video signal with a video signal for displaying a video used to specify a division display area to which the video signal determined to be a video signal that does not satisfy the display reference is to be input.

2. The video signal processing apparatus according to claim 1, wherein the signal replacement unit is configured to replace the improper video signal with any one of video signals determined by the display reference determination unit to be video signals that are able to be displayed in the division display areas.

3. The video signal processing apparatus according to claim 2, wherein the signal replacement unit is configured to replace the improper video signal with a preset video signal with a high priority among video signals determined by the display reference determination unit to be video signals that satisfy the display reference for performing video display.

4. The video signal processing apparatus according to claim 1, wherein the signal replacement unit is configured to replace the improper video signal with a video signal that indicates an analysis result of the improper video signal determined to be a video signal that does not satisfy the display reference.

5. The video signal processing apparatus according to claim 4, wherein the video signal that indicates the analysis result of the improper video signal is a video signal with which at least one of a clock frequency, a horizontal resolution, and a vertical resolution is displayed.

6. The video signal processing apparatus according to claim 1, wherein the signal replacement unit is configured to replace the improper video signal with a color signal with which the entirety of the respective one of the division display areas to which the video signal is to be input is displayed in a single color.

7. The video signal processing apparatus according to claim 6, wherein the color signal is a solid black signal with which the entirety of the respective one of the division display areas is filled with black color.

8. A video display apparatus comprising:
the video signal processing apparatus according to claim 1.

9. An electronic device comprising:
the video signal processing apparatus according to claim 1.

10. A video signal processing apparatus configured to output video signals to respective division display areas of a display apparatus in parallel, the video signals being obtained by dividing an input video with a resolution higher than full high-definition (HD) resolution, the division display areas being divided areas of a display area of the display apparatus, the video signal processing apparatus comprising:
a memory and a processor, the memory containing computer readable instructions that, when executed by the processor, configure the processor to,
synchronize the video signals to be input to the respective division display areas,
determine if one or more of the video signals is an improper video signal that fails to satisfy a display reference for performing video display in a respective one of the division display areas corresponding thereto, and
replace the improper video signal with a proper video signal that satisfies the display reference.

11. A video display apparatus comprising:
the video signal processing apparatus according to claim 10; and
the display area having the division display areas therein, the display area configured to display the video signals simultaneously in respective ones of the division display areas to produce the resolution higher the than the full HD resolution.

12. A video signal processing apparatus configured to output video signals to respective division display areas of a display apparatus in parallel, the video signals being obtained by dividing an input video with a resolution higher than full high-definition (HD) resolution, the division display areas being divided areas of a display area of the display apparatus, the video signal processing apparatus comprising:
a synchronization unit configured to synchronize the video signals to be input to the respective division display areas;
a display reference determination unit configured to determine if one or more of the video signals is an improper video signal that fails to satisfy a display reference for performing video display in a respective one of the division display areas corresponding thereto; and
a signal replacement unit configured to replace the improper a video signal with a proper video signal that satisfies the display reference.

13. The video signal processing apparatus according to claim 12, wherein the signal replacement unit is configured to replace the improper video signal with the proper video signal such that the proper video signal is any one of video signals determined by the display reference determination unit to be video signals that are able to be displayed in the division display areas.

14. The video signal processing apparatus according to claim 13, wherein the signal replacement unit is configured to replace the improper video signal with the proper video signal such that the proper video signal is a preset video signal with a high priority among video signals determined by the display reference determination unit to be video signals that satisfy the display reference for performing video display.

15. The video signal processing apparatus according to claim 12 wherein the signal replacement unit is configured to replace the improper video signal with the proper video signal such that the proper video signal is a video signal that indicates an analysis result of the improper video signal determined to be a video signal that does not satisfy the display reference.

16. The video signal processing apparatus according to claim 15, wherein the video signal that indicates the analysis result of the improper video signal is a video signal with which at least one of a clock frequency, a horizontal resolution, and a vertical resolution is displayed.

17. The video signal processing apparatus according to claim 12, wherein the signal replacement unit is configured to replace the improper video signal with the proper video signal such that the proper video signal is a color signal with which the entirety of the respective one of the division display areas to which the video signal is to be input is displayed in a single color.

18. The video signal processing apparatus according to claim 17, wherein the color signal is a solid black signal with which the entirety of the respective one of the division display areas is filled with black color.

19. A video display apparatus comprising:
the video signal processing apparatus according to claim 12.

20. An electronic device comprising:
the video signal processing apparatus according to claim 12.

* * * * *